US011822763B2

(12) United States Patent
Tran

(10) Patent No.: US 11,822,763 B2
(45) Date of Patent: Nov. 21, 2023

(54) SYSTEM AND METHOD FOR SYNCHRONIZATION OF MULTIPLE USER DEVICES IN COMMON VIRTUAL SPACES

(71) Applicant: PEER INC, Bellevue, WA (US)

(72) Inventor: Thinh Tran, Bellevue, WA (US)

(73) Assignee: PEER INC, Bellevue, WA (US)

( * ) Notice: Subject to any disclaimer, the term of this patent is extended or adjusted under 35 U.S.C. 154(b) by 0 days.

(21) Appl. No.: 17/752,684

(22) Filed: May 24, 2022

(65) Prior Publication Data

US 2022/0382436 A1    Dec. 1, 2022

Related U.S. Application Data

(60) Provisional application No. 63/194,082, filed on May 27, 2021.

(51) Int. Cl.
*G06F 3/04815* (2022.01)
*H04W 12/06* (2021.01)
*G06F 3/04842* (2022.01)

(52) U.S. Cl.
CPC ...... *G06F 3/04815* (2013.01); *G06F 3/04842* (2013.01); *H04W 12/06* (2013.01)

(58) Field of Classification Search
CPC .... G06F 3/04815; G06F 3/0485; G06F 21/44; G06F 2203/04802; G06F 3/0482
See application file for complete search history.

(56) References Cited

U.S. PATENT DOCUMENTS

| | | | |
|---|---|---|---|
| 6,366,285 B1* | 4/2002 | Brush, II | G06F 3/011 715/848 |
| 10,747,414 B2 | 8/2020 | Tran | |
| 2001/0034661 A1* | 10/2001 | Ferreira | G06Q 30/0643 705/26.8 |
| 2010/0001993 A1* | 1/2010 | Finn | A63F 13/79 345/582 |
| 2013/0097563 A1* | 4/2013 | Pacheco Rodrigues Velho | G06F 3/0488 715/850 |
| 2013/0318445 A1* | 11/2013 | Mitchell | G06F 3/0488 715/744 |
| 2018/0096524 A1* | 4/2018 | Ekambaram | G06F 3/03547 |
| 2020/0342144 A1* | 10/2020 | Alameh | G06F 3/0482 |
| 2022/0057915 A1* | 2/2022 | Tran | G06F 21/44 |

* cited by examiner

*Primary Examiner* — David D Davis
(74) *Attorney, Agent, or Firm* — SEED INTELLECTUAL PROPERTY LAW GROUP LLP

(57) ABSTRACT

An orthogonal or multi-dimensional fabric user interface is described herein. A remote server executes an operating system that stores content in a multi-dimensional fabric. Multiple users can access a common virtual space to view content that is stored in the multi-dimensional fabric at a specific location and time. The users request the specific location and time. The remote server accesses the multi-dimensional fabric to anchor content within the common virtual space based on the specific location and time. In this way, multiple users experience location and time driven content together.

23 Claims, 12 Drawing Sheets

SYSTEM AND METHOD FOR SYNCHRONIZATION OF MULTIPLE USER DEVICES IN COMMON VIRTUAL SPACES

BACKGROUND

Technical Field

The present application pertains to linked virtual environments, and more particularly, to linked virtual environments that are synchronizers for the devices of multiple users.

Description of the Related Art

Operating systems have changed little over the past few decades. Early operating systems were command driven, where a user specified a particular file location to access data. These operating systems morphed into the icon-based interfaces used today. Icon-based operating systems display graphical representations, or icons, of files or data. Icons are associated with a particular file location, such that interaction with an icon by a user results in the corresponding file location being accessed. Accordingly, historical operating systems have been structured around using the file's location within the memory to access data, which limits the flexibility of using alternative storage structures.

Additionally, there is a continuing desire to virtually visit actual physical locations that exist in the real world for a variety of purposes. This may be as basic as using a mapping software application. However, traditional mapping software is very limited in the information that is conveys and the user experience that it provides. The present disclosure address this and other needs.

BRIEF SUMMARY

Briefly stated, embodiments of the present disclosure are directed towards systems for synchronization of multiple user devices in a common virtual space using a multi-dimensional fabric that stores content to be viewed within the common virtual space. Briefly, the multi-dimensional fabric stores content using time and location coordinates, which can be accessed in accordance with a location and time associated with the common virtual space. In this way, separate user devices can be synchronized within a common virtual space to display content to separate users.

In some embodiments, the system for synchronization of multiple user devices in a common virtual space, includes first and second personal mobile computing devices that store authentication information, and a remote server. The first and second personal mobile computing devices each include a device memory that stores device computer instructions and a device processor that executes the device computer instructions. Execution of the device computer instructions by the device processor causes the personal mobile computing device to determine when a personal mobile computing device of the first and second personal mobile computing devices is within range of a display device of first and second display devices. Execution of the device computer instructions by the device processor coordinates authentication between the personal mobile computing device and a remote server. Execution of the device computer instructions by the device processor displays a multi-dimensional fabric user interface of a common virtual space to a user of the personal mobile computing device. The common virtual space represents actual physical locations at a specific time and is displayed to first and second users of the first and second personal mobile computing devices based on valid authentication of each personal mobile computing device in association with each user. Execution of the device computer instructions by the device processor receives input from the first user including a virtual location, date, and time at which the first user requests to visit, and receive input from the second user including a virtual location, date, and time at which the second user requests to visit.

The remote server includes a server memory that stores server computer instructions and a server processor that when executing the server computer instructions causes the remote server to select the multi-dimensional fabric user interface specific for the first and second users based on the valid authentication of the personal mobile computing device, and the virtual location, date, and time at which the first and second users request to visit. Execution of the server computer instructions by the server processor provides the multi-dimensional fabric user interface of the common virtual space to the first and second display devices. The common virtual space is synchronized by the remote server to enable the first and second users that are using the first and second personal mobile computing devices and the first and second display devices, respectively, to access a same virtual location, date, and time requested by the first and second users that represents an actual physical location. Execution of the server computer instructions by the server processor manipulates the multi-dimensional fabric user interface of the common virtual space based on received input from the first and second users via their associated first and second personal mobile computing devices. Execution of the server computer instructions by the server processor provides the manipulated multi-dimensional fabric user interface of the common virtual space to the first and second display devices to be displayed to the first and second users. The manipulating of the multi-dimensional fabric user interface of the common virtual space includes enabling the first and second users to interact with each other and with virtual objects and virtual events at the virtual location, date, and time at which the first and second users request to visit.

In some embodiments of the system for synchronization of multiple user devices in a common virtual space, the personal mobile computing devices are selected from a group of computers, smart phones, and smart watches. In another aspect of some embodiments, the display devices are any device that has an accessible display screen, such as television monitor, computer monitor, tablet screen, smart phone screen, automobile-mounted display screen, and the like.

In another aspect of some embodiments, the server processor of the system executes further server computer instructions that further cause the remote server to enable filters that control the sights and experiences that are visible and available to the first and second user in the multi-dimensional fabric user interface of the common virtual space. In still another aspect of some embodiments, the server processor of the system executes further server computer instructions that further cause the remote server to enable the first and second users with same user-selectable filters selected to have the same virtual experience in the multi-dimensional fabric user interface, and enable the first and second with different user-selectable filters selected to have different virtual experiences in the multi-dimensional fabric user interface. In yet another aspect of some embodiments, the server processor of the system executes further server computer instructions that further cause the remote server to enable the first and second users to interact with the virtual location and each other in the multi-dimensional fabric user interface to execute one or more of the following actions buy, sell, upload, download, post, and live stream. In some embodiments of the system, the virtual objects include one or more of stores, restaurants, vendors, offices, buildings, parking lots, and parks.

In one or more aspects of some embodiments, the server processor of the system executes further server computer instructions that further cause the remote server to enable advertisements in the multi-dimensional fabric user interface of the common virtual space at a specific virtual location and for a specific period of time. In another aspect of some embodiments, the server processor of the system executes further server computer instructions that further cause the remote server to enable the first and second users to visit a specific place and a current time in the multi-dimensional fabric user interface of the common virtual space. In still another aspect of some embodiments, the server processor of the system executes further server computer instructions that further cause the remote server to enable the first and second users to visit a specific physical location in a past at a specific time and date in the multi-dimensional fabric user interface of the common virtual space. In yet another aspect of some embodiments, the server processor of the system executes further server computer instructions that further cause the remote server to enable the first and second users to visit a specific physical location in a future at a specific time and date in the multi-dimensional fabric user interface of the common virtual space.

In another aspect of some embodiments, the server processor of the system executes further server computer instructions that further cause the remote server to enable the first and second users to visit a specific physical location and appear as their own avatar in the multi-dimensional fabric user interface of the common virtual space. In still another aspect of some embodiments, the server processor of the system executes further server computer instructions that further cause the remote server to enable the first and second users to visit a specific physical location and be anonymous without giving up their location in the multi-dimensional fabric user interface of the common virtual space. In some embodiments of the system, the distance in the multi-dimensional fabric user interface of the common virtual space is measured by travel time. In another aspect of some embodiments, travel time-distance in the multi-dimensional fabric user interface of the common virtual space relates to a travel time for specific selectable modes of transportation. In still another aspect of some embodiments, the specific modes of transportation include automobile, bicycle, and pedestrian.

In some embodiments, the server processor of the system executes further server computer instructions that further cause the remote server to enable travel time-distance in multi-dimensional fabric user interface of the common virtual space to dynamically adjust for one or more of traffic, whether, accidents, road conditions, toll roads, one-way streets, available sidewalks, available bicycle trails, and protests. In another aspect of some embodiments, the server processor of the system executes further server computer instructions that further cause the remote server to enable travel time-distance in the multi-dimensional fabric user interface of the common virtual space to be displayed using concentric time rings radiating out from a virtual location of the first or second user, wherein the concentric time rings each represent a number of minutes of elapsed time. In still another aspect of some embodiments, the manipulation of the multi-dimensional fabric user interface of the common virtual space that is based on the received input from the first and second users includes anchoring digital content to the multi-dimensional fabric user interface of the common virtual space. In yet another aspect of some embodiments, the manipulation of the multi-dimensional fabric user interface of the common virtual space that is based on the received input from the first and second users includes anchoring digital content to a user in the multi-dimensional fabric user interface of the common virtual space.

In some embodiments of the system for synchronization of multiple user devices in a common virtual space, the server processor executes further server computer instructions that further cause the remote server to enable the first and second users to see each other's avatar and interact with others' avatars, in response to receiving requests from the first and second users to visit a same virtual location, date, and time. In other embodiments of the remote server system for synchronization of multiple user devices in a common virtual space, the server processor executes further server computer instructions that further cause the remote server to enable the first and second users to not see each other's avatar and not interact with others' avatar, in response to receiving requests from the first and second users to visit a different virtual location, date, or time.

In another aspect of some embodiments, the system accesses weather data and displays the recorded weather at a particular location and date in the past or present time (e.g., if the recorded weather showed rain, then it would be raining on the user's avatar as it walked down the virtual street). In another such embodiment, the system accesses forecast weather data and displays the forecast weather at a particular location and date at a near future date that is accessible within forecasting weather data (e.g., if the forecast weather showed rain, then it would be raining on the user's avatar as it walked down the virtual street).

In another embodiment, the remote server system for synchronization of multiple user devices in a common virtual space, includes a server processor and a server memory that stores server computer instructions. The server processor executes the server computer instructions causing the remote server to select a multi-dimensional fabric user interface of a common virtual space that is specific for first and second users based on valid authentication of first and second personal mobile computing devices associated with the first and second users. Execution of the server computer instructions by the server processor also provides the multi-dimensional fabric user interface of the common virtual space that represents actual physical locations to first and second users of the first and second personal mobile computing devices. The common virtual space is synchronized by the remote server to enable the first and second users that are using the first and second personal mobile computing devices to access a same virtual location, date, and time requested by the first and second users that represents an actual physical location. Execution of the server computer instructions by the server processor also manipulates the multi-dimensional fabric user interface of the common virtual space based on received input from the first and second users via their associated first and second personal mobile computing devices. The received input includes a virtual location, date, and time at which the first and second users request to visit, and wherein the manipulation of the multi-dimensional fabric user interface based on the received input from the first and second users includes anchoring digital content to the multi-dimensional fabric user interface of the common virtual space. Execution of the server computer instructions by the server processor also provides the manipulated multi-dimensional fabric user interface to the plurality of personal mobile computing devices for display to the multiple users. Additionally, the manipulating of the multi-dimensional fabric user interface of the common virtual space includes enabling the first and second users to interact with each other and with virtual objects and virtual events in the virtual location, date, and time at which the first and second users request to visit.

In another aspect of some embodiments of the remote sever system, the server processor of the remote sever system executes further server computer instructions that further cause the remote server to enable filters that control the sights and experiences that are visible and available to the first and second user in the multi-dimensional fabric user interface of the common virtual space. In still another aspect of some embodiments, the server processor of the remote sever system executes further server computer instructions that further cause the remote server to enable the first and second users with same user-selectable filters selected to have the same virtual experience in the multi-dimensional fabric user interface, and enable the first and second with different user-selectable filters selected to have different virtual experiences in the multi-dimensional fabric user interface. In yet another aspect of some embodiments, the server processor of the remote sever system executes further server computer instructions that further cause the remote server to enable the first and second users to interact with the virtual location and each other in the multi-dimensional fabric user interface to execute one or more of the following actions buy, sell, upload, download, post, and live stream. In some embodiments of the remote sever system, the virtual objects include one or more of stores, restaurants, vendors, offices, buildings, parking lots, and parks.

In one or more aspects of some embodiments of the remote sever system, the server processor of the remote sever system executes further server computer instructions that further cause the remote server to enable advertisements in the multi-dimensional fabric user interface of the common virtual space at a specific virtual location and for a specific period of time. In another aspect of some embodiments, the server processor of the remote sever system executes further server computer instructions that further cause the remote server to enable the first and second users to visit a specific place and a current time in the multi-dimensional fabric user interface of the common virtual space. In still another aspect of some embodiments, the server processor of the remote sever system executes further server computer instructions that further cause the remote server to enable the first and second users to visit a specific physical location in a past at a specific time and date in the multi-dimensional fabric user interface of the common virtual space. In yet another aspect of some embodiments, the server processor of the remote sever system executes further server computer instructions that further cause the remote server to enable the first and second users to visit a specific physical location in a future at a specific time and date in the multi-dimensional fabric user interface of the common virtual space.

In another aspect of some embodiments of the remote sever system, the server processor of the remote sever system executes further server computer instructions that further cause the remote server to enable the first and second users to visit a specific physical location and appear as their own avatar in the multi-dimensional fabric user interface of the common virtual space. In still another aspect of some embodiments, the server processor of the remote sever system executes further server computer instructions that further cause the remote server to enable the first and second users to visit a specific physical location and be anonymous without giving up their location in the multi-dimensional fabric user interface of the common virtual space. In some embodiments of the remote sever system, the distance in the multi-dimensional fabric user interface of the common virtual space is measured by travel time. In another aspect of some embodiments of the remote sever system, travel time-distance in the multi-dimensional fabric user interface of the common virtual space relates to a travel time for specific selectable modes of transportation. In still another aspect of some embodiments of the remote sever system, the specific modes of transportation include automobile, bicycle, and pedestrian.

In some embodiments of the remote sever system, the server processor of the remote sever system executes further server computer instructions that further cause the remote server to enable travel time-distance in multi-dimensional fabric user interface of the common virtual space to dynamically adjust for one or more of traffic, whether, accidents, road conditions, toll roads, one-way streets, available sidewalks, available bicycle trails, and protests. In another aspect of some embodiments, the server processor of the remote sever system executes further server computer instructions that further cause the remote server to enable travel time-distance in the multi-dimensional fabric user interface of the common virtual space to be displayed using concentric time rings radiating out from a virtual location of the first or second user. The concentric time rings each represent a number of minutes of elapsed time. In still another aspect of some embodiments of the remote sever system, the manipulation of the multi-dimensional fabric user interface of the common virtual space that is based on the received input from the first and second users includes anchoring digital content to the multi-dimensional fabric user interface of the common virtual space. In yet another aspect of some embodiments of the remote sever system, the manipulation of the multi-dimensional fabric user interface of the common virtual space that is based on the received input from the first and second users includes anchoring digital content to a user in the multi-dimensional fabric user interface of the common virtual space.

In some embodiments of the remote server system for synchronization of multiple user devices in a common virtual space, the server processor executes further server computer instructions that further cause the remote server to enable the first and second users to see each other's avatar and interact with others' avatars, in response to receiving requests from the first and second users to visit a same virtual location, date, and time. In other embodiments of the remote server system for synchronization of multiple user devices in a common virtual space, the server processor executes further server computer instructions that further cause the remote server to enable the first and second users to not see each other's avatar and not interact with others' avatar, in response to receiving requests from the first and second users to visit a different virtual location, date, or time.

In another aspect of some embodiments, the remote sever system accesses weather data and displays the recorded weather at a particular location and date in the past or present time (e.g., if the recorded weather showed rain, then it would be raining on the user's avatar as it walked down the virtual street). In another such embodiment, the remote sever system accesses forecast weather data and displays the forecast weather at a particular location and date at a near future date that is accessible within forecasting weather data (e.g., if the forecast weather showed rain, then it would be raining on the user's avatar as it walked down the virtual street).

In another embodiment, the method for synchronization of multiple user devices in a common virtual space using a remote server includes selecting a multi-dimensional fabric user interface of a common virtual space that is specific for the first and second users based on valid authentication of first and second personal mobile computing devices associated with the first and second users. Another operation of the method for synchronization includes providing the multi-dimensional fabric user interface of the common virtual space that represents actual physical locations to first and second users of the first and second personal mobile computing devices. Still another operation of the method for synchronization includes manipulating the multi-dimensional fabric user interface based on received input from the first and second users via their associated first and second personal mobile computing devices. The received input includes a virtual location, date, and time at which the first and second users request to visit, and wherein the manipulation of the multi-dimensional fabric user interface based on the received input from the first and second users includes anchoring digital content to the multi-dimensional fabric user interface of the common virtual space. Yet, another operation of the method for synchronization includes providing the manipulated multi-dimensional fabric user interface to the first and second users for display. A further operation of the method for synchronization includes synchronizing the common virtual space using the remote server to enable the first and second users using the first and second personal mobile computing devices, respectively, to access a same virtual location that represents an actual physical location, date, and time requested by the first and second users. Moreover, another operation of the method for synchronization includes enabling the first and second users to interact with each other and with virtual objects and virtual events in the virtual location, date, and time at which the first and second users request to visit that represents an actual physical location.

In some embodiments of the method for synchronization of multiple user devices in a common virtual space using a remote server, the server processor executes further server computer instructions that further cause the remote server to enable the first and second users to see each other's avatar and interact with others' avatars, in response to receiving requests from the first and second users to visit a same virtual location, date, and time. In other embodiments of the method for synchronization of multiple user devices in a common virtual space using a remote server, the server processor executes further server computer instructions that further cause the remote server to enable the first and second users to not see each other's avatar and not interact with others' avatar, in response to receiving requests from the first and second users to visit a different virtual location, date, or time.

The embodiments described in the present disclosure improve upon known data storage architectures, structures, processes, and techniques in a variety of different computerized technologies, such as operating systems, user interfaces, and social networks.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
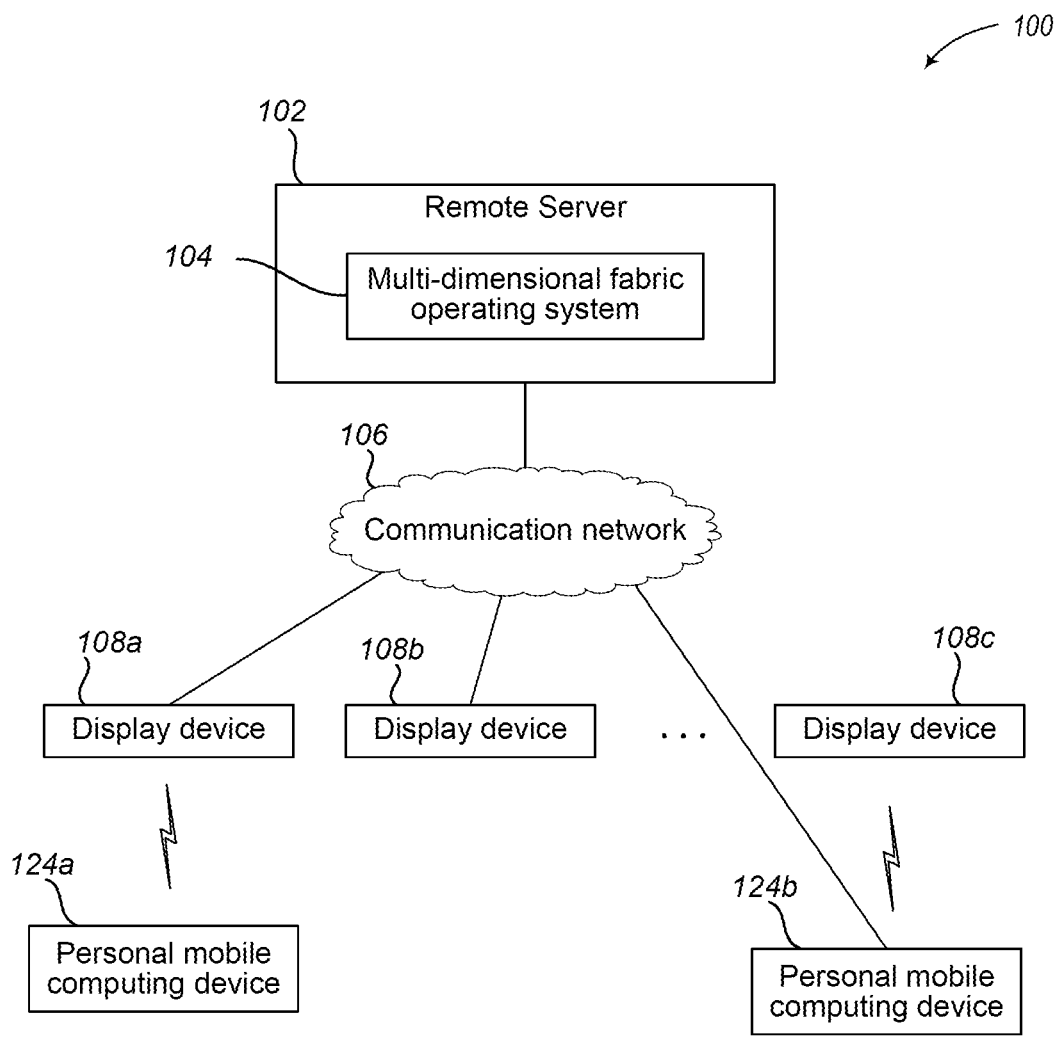
FIG. 1 illustrates a context diagram of an environment that provides a multi-dimensional fabric user interface for storing content in accordance with embodiments described herein.

FIG. 1 illustrates a context diagram of a system for synchronized common virtual spaces in which an environment 100 that provides a multi-dimensional fabric user interface for storing content in accordance with embodiments described herein. In the illustrated example, environment 100 includes a remote server 102, one or more display devices 108a-108c, and one or more personal mobile computing devices.

The remote server 102 in the system for synchronized common virtual spaces is configured as a remote computing system, e.g., cloud computing resources, which implements or executes a multi-dimensional fabric operating system 104. In various embodiments, a separate instance of the multi-dimensional fabric operating system 104 is maintained and executing for each separate personal mobile computing device 124a, 124b. In some embodiments, the multi-dimensional fabric user interface may be implemented as an operating shell.

Although not illustrated, the remote server 102 may also be running various programs that are accessible to the users of the personal mobile computing devices 124a, 124b via the multi-dimensional fabric operating system 104. Accordingly, the environment and system described herein make it possible for a plurality of applications to be run in the cloud, and a user accesses a particular application by moving the fabric to that application's coordinates.

The multi-dimensional fabric operating system 104 stores content according to a plurality of different dimensions. In some embodiments, the content is stored based on when the content was captured by the user or when it was stored by the remote server 102 (e.g., a time stamp added to a picture when the picture was captured or a time stamp when the picture was uploaded to the remote server), where the content was captured by the user (e.g., the location of the camera that captured the picture or a location of a display device used to upload the picture from the camera to the remote server), and what the content is about (e.g., food, clothing, entertainment, transportation, etc.).

A user in the system for synchronized common virtual spaces can access the multi-dimensional fabric operating system 104 via a display device 108a. The user has a personal mobile computing device 124, which can create or obtain content. The user can walk up to or approach a display device 108. The display device 108 coordinates authentication of the personal mobile computing device 124 with the remote server 102. The user can then use the display device 108 as a personal computer to upload content from the personal mobile computing device 124 to the remote server 102 using the multi-dimensional fabric operating system 104. Similarly, the user can use the display device 108 to access content previously stored by the multi-dimensional fabric operating system 104. For example, the user can use hand gestures, or touch interfaces, to provide input that manipulates a user interface displayed on the display device 108, where the user interface is generated by the multi-dimensional fabric operating system 104. The remote server 102 can respond to the input by providing an updated user interface of the multi-dimensional fabric to the display device 108 for display to the user. Notably, the user may transmit between the personal mobile computing device 124b and the remote server 102 via the communication network 106, without connecting to a display device 108 in some embodiments.

Figure 2:
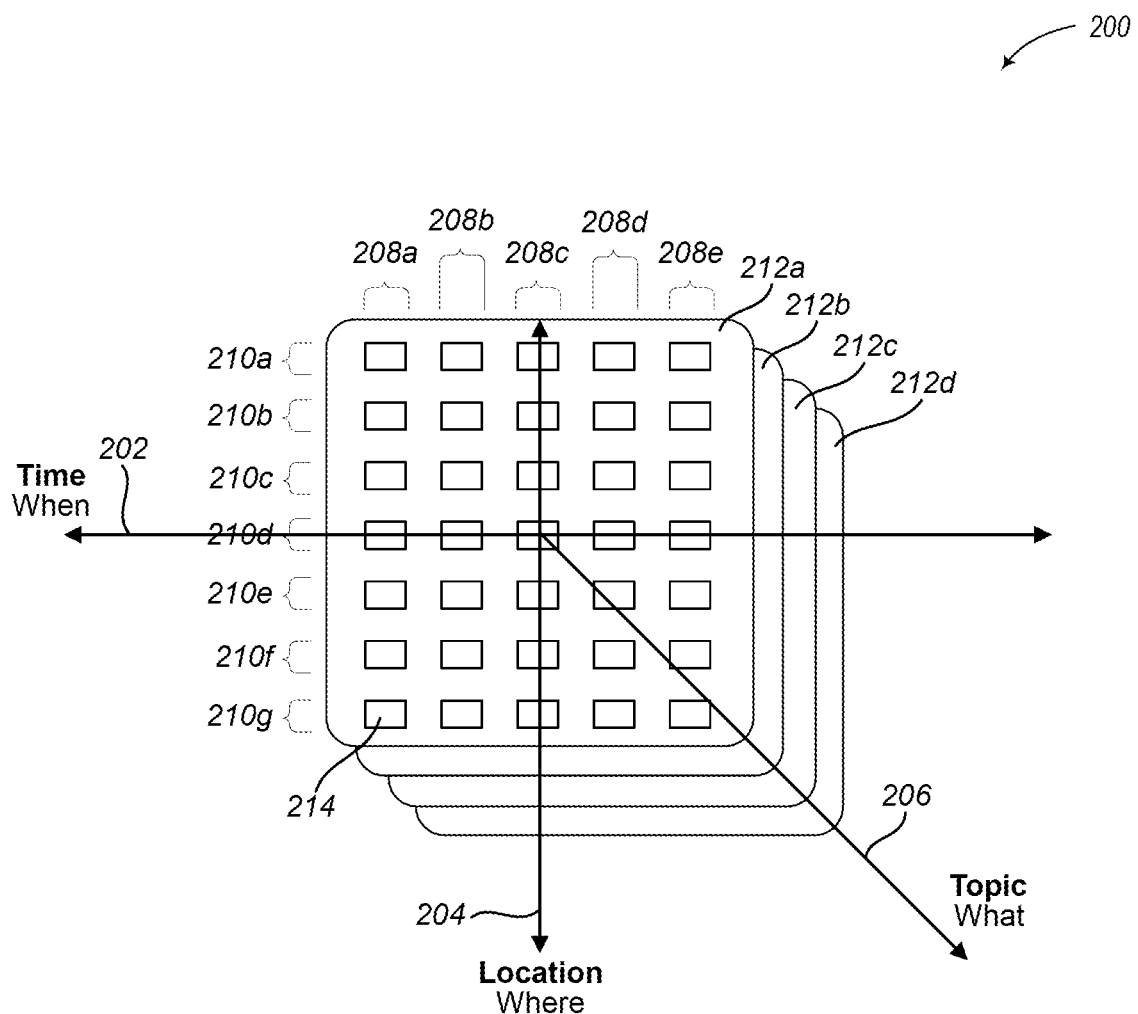
FIG. 2 illustrates a graphical representation of a multi-dimensional fabric user interface for storing content in accordance with embodiments described herein.
Figure 3:
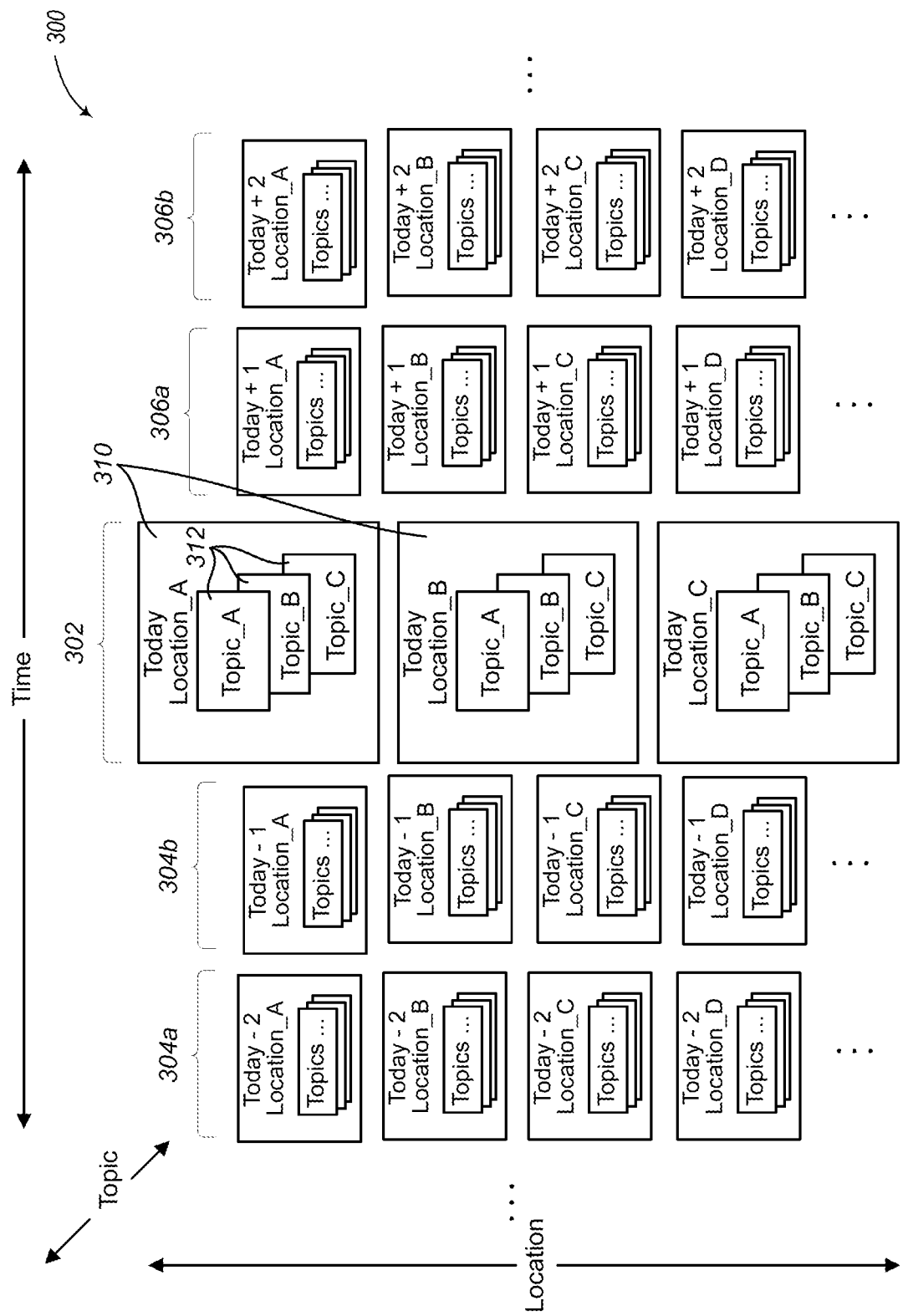
FIG. 3 illustrates another graphical representation of a multi-dimensional fabric user interface for storing content in accordance with embodiments described herein.

FIGS. 2 and 3 illustrate graphical representations of use case examples of a multi-dimensional fabric user interface for storing content in accordance with embodiments described herein.

Example fabric 200 in FIG. 2 includes a time axis 202, a location axis, and a topic axis 206. Although fabric 200 appears to be constrained in each axis, embodiments are not so limited. Rather, fabric or graphical environment is flexible, while the coordinate is fixed. This allows a user to use cruder movements, like the swipe of an arm, to achieve refined movement to arrive at the content. This also reduces the content footprint because it does not need to manage a file structure, which improves throughput to a degree that it can run entirely in the cloud.

In some embodiments, users in the multi-dimensional fabric system navigate by moving the environment, or fabric, to a specific content or item. The content is placed within a 3-Dimensional structure of Time (when)+Location (where)+Topic (what), which may be in the form of a multi-dimensional coordinate system. By configuring the content in the fabric based on 3 dimensions (What, When, Where), the fabric provides a pre-configured scaffold that allows a user to navigate the plurality of content without the multi-dimensional fabric system fetching and organizing it. The fabric makes discovering more relevant content immediately accessible.

The time axis 202 in the multi-dimensional fabric system may be arranged as a plurality of different time periods, such as hours or days. In various embodiments, the current time period (e.g., today) is shown in the middle column 208c, which is shown in FIG. 3. The location axis 204 may be arranged as a plurality of different locations. In some embodiments, the content locations are selected based on a distance from a current location of the display device that is accessing the fabric 200. For example, locations closest to the display device are arranged in the top column 210a and the locations furthest from the display device are arrange in the bottom column 210g. Likewise, topics may be arranged based on themes or nearest to the display device. For example, food content may be in layer 212a, entertainment content in layer 212b, transportation content in layer 212c, etc. In other embodiments, the topics may be arranged based on frequency of access to the user based on location.

The fabric 200 in the multi-dimensional fabric system illustrates a plurality of icons 214 that each represent separate content (also referred to as content 214). The content 214 is laid out in a plurality of time periods 208a-208e (columns), a plurality of locations 210a-210g (rows), and a plurality of topics 212a-212d (layers), using coordinates associated with the separate dimensions. For any given point defined by (What, When, Where) there is a finite amount of content or data. As a result, users can simply point out a certain What, When, and Where to know where something is located and can directly access it from that point.

In some embodiments of the multi-dimensional fabric system, the location rows 210, time columns 208, and topic layers may be independent from one another such that a user can manipulate a single axis. In other embodiments, the user can manipulate two or more axes. For example, a user can vertically scroll along the location axis 204 through a single column (e.g., single time period on the time axis), such as column 208c, without affecting the other columns or layers, or the user can vertically scroll along the location axis 204 for multiple columns or multiple layers, or both. Likewise, the user can horizontally scroll along the time axis 202 through a single row (e.g., single location on the location axis), such as row 210d, without affecting the other rows or layers, or the user can horizontally scroll along the time axis 202 for multiple rows or multiple layers, or both. Moreover, the user can depth scroll along the topic axis 206 through a single layer (e.g., single topic on the topic axis), such as layer 212a, without affecting the other rows or columns, or the user can depth scroll along the topic axis 206 for multiple rows or multiple columns, or both.

By providing input to one or more axes in the multi-dimensional fabric system, the user can manipulate or move the fabric 200 to access content for a specific time, a specific location, and a specific topic. The user can scroll on a particular axis by providing one or more hand gestures. For example, a horizontal movement of the user's arm may move the time axis 202, a vertical movement of the user's arm may move the location axis 204, and an in-or-out movement of the user's arm may move the topic axis 206. The user can then select a specific content 214, such as the content in the middle (along time and location axes) and on top (along the topic axis) of the fabric by moving their arm away from the display screen or by making a first or by opening their hand.

In some embodiments of the multi-dimensional fabric system, the fabric will look two dimensional to a user, but is actually three dimensional, such that when a two-dimensional point is selected by the user, the user can switch axes to view the third dimension. And although FIG. 2 shows the time axis 202 and the location axis 204 on this top-level two-dimensional view, other combinations of axes may also be used, e.g., time v. topic, location v. topic, or other non-illustrated axes.

Figure 5:
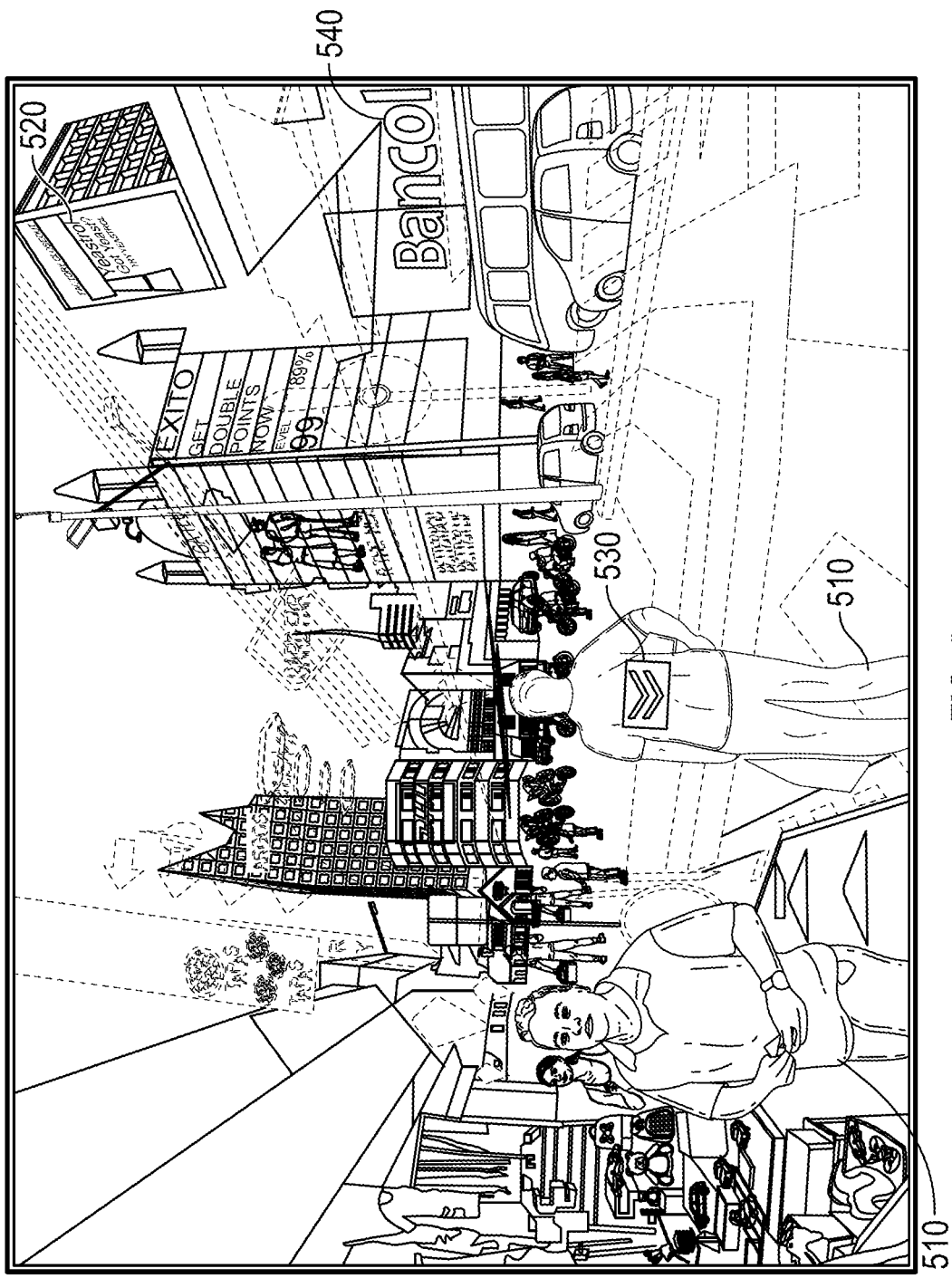
FIG. 5 illustrates a multi-dimensional fabric user interface at a first time that is accessed from disparate virtual and physical spaces via multiple users each having a processor-based device, in which store fronts are viewable but there are no advertisements are viewable.
Figure 6:
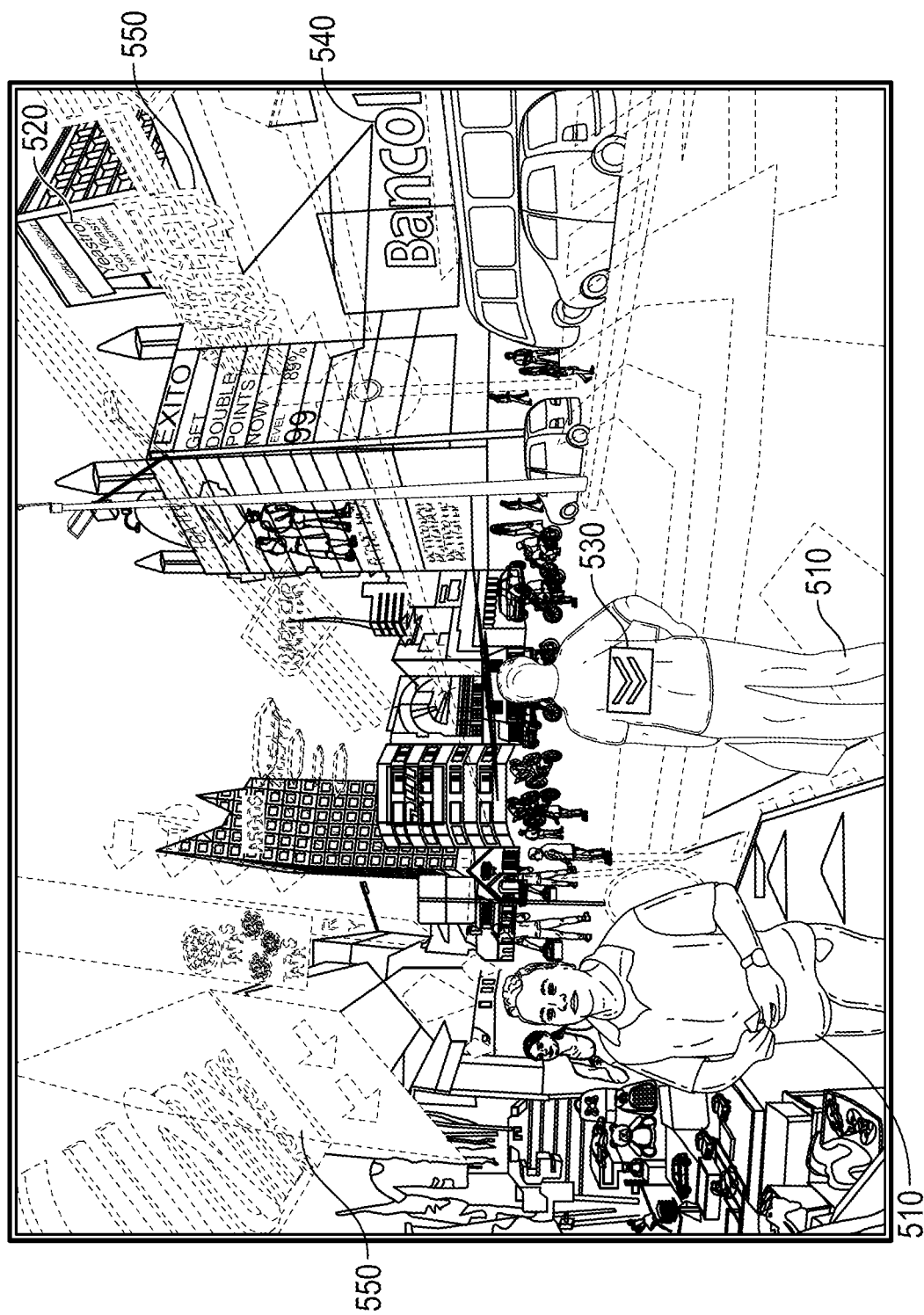
FIG. 6 illustrates a multi-dimensional fabric user interface at a second time that is accessed from disparate virtual and physical spaces via multiple users each having a processor-based device, in which store fronts are viewable and a first group of advertisements are viewable.
Figure 7:
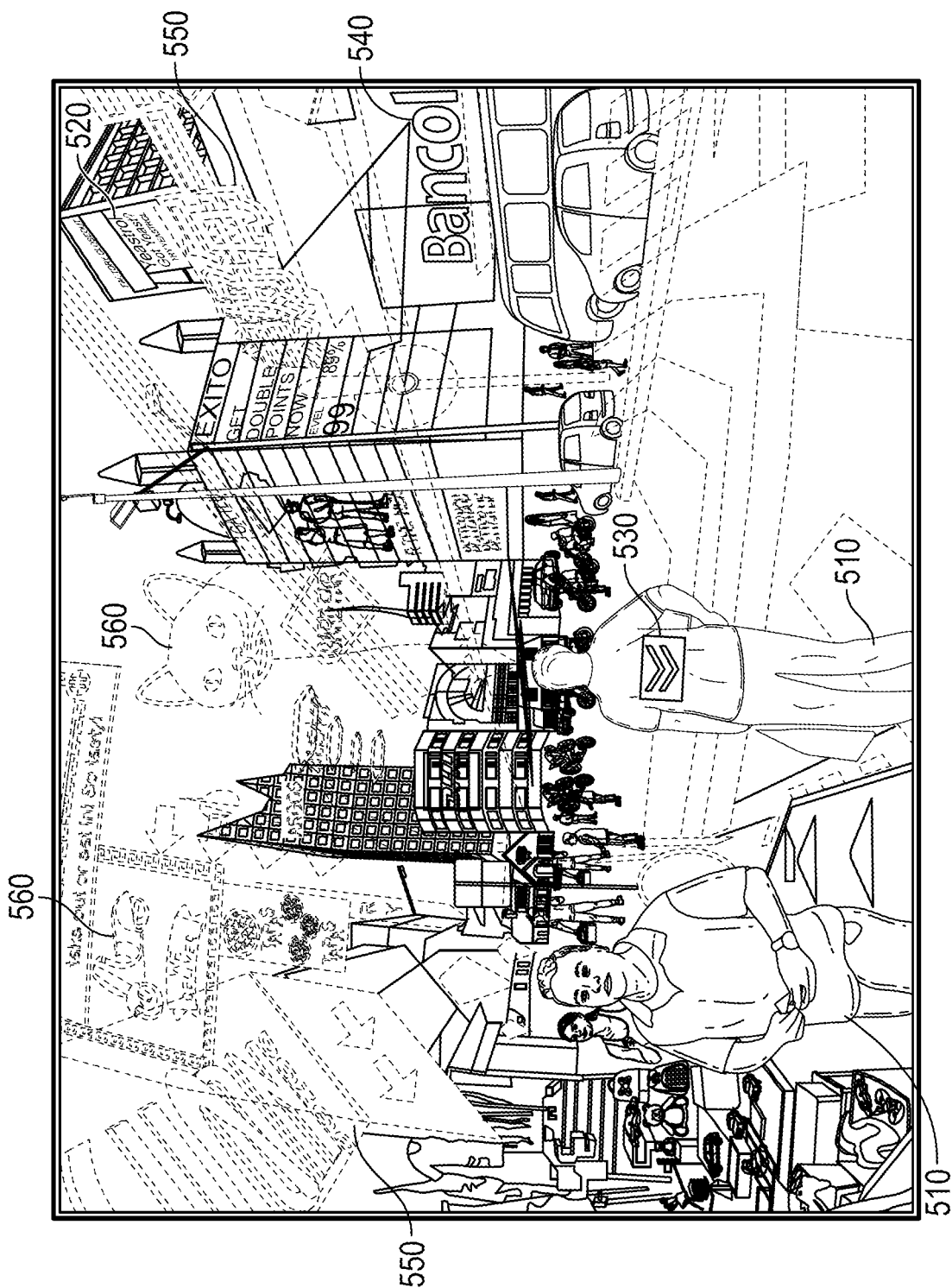
FIG. 7 illustrates a multi-dimensional fabric user interface at a third time that is accessed from disparate virtual and physical spaces via multiple users each having a processor-based device, in which store fronts are viewable and a first and second group of advertisements are viewable.

Example fabric 300 in FIG. 3 is similar to fabric 200 in FIG. 2, but is an example of how the fabric 300 can be displayable to a user outside of a common virtual space. Examples of using a multi-dimensional fabric within a common virtual space are shown in FIGS. 5-7.

In this example illustration in FIG. 3, the current time period 302 is illustrated in a middle column with future time periods 306a, 306b to the right of the current time period 302 and past time periods 304a, 304b to the left of the current time period. Each location 310 in the current time period 302 includes a plurality of topics 312. These topics 312 are similar to the layers 212 in FIG. 2.

Again, the user in the multi-dimensional fabric system can move or manipulate the fabric 300 along one or more axes to select a particular piece of content. Once selected, the particular content is displayed to the user. Various embodiments, of the multi-dimensional fabric described herein can be used for a variety of different content storage technologies. One example technology is the fluid timeline social network described in U.S. patent application Ser. No. 16/300,028, filed Nov. 8, 2018, titled FLUID TIMELINE SOCIAL NETWORK, and issued Aug. 18, 2020, as U.S. Pat. No. 10,747,414, which is incorporated herein by reference.

The operation of certain aspects of the disclosure will now be described with respect to FIGS. 4A and 4B. In at least one of various embodiments of the system for synchronized common virtual spaces, process 400 described in conjunction with FIG. 4A may be implemented by or executed by a system of one or more computing devices, such as display device 108 in FIG. 1, and process 500 described in conjunction with FIG. 4B may be implemented by or executed by a system of one or more remote computing devices, remote server 102.

Figure 4A:
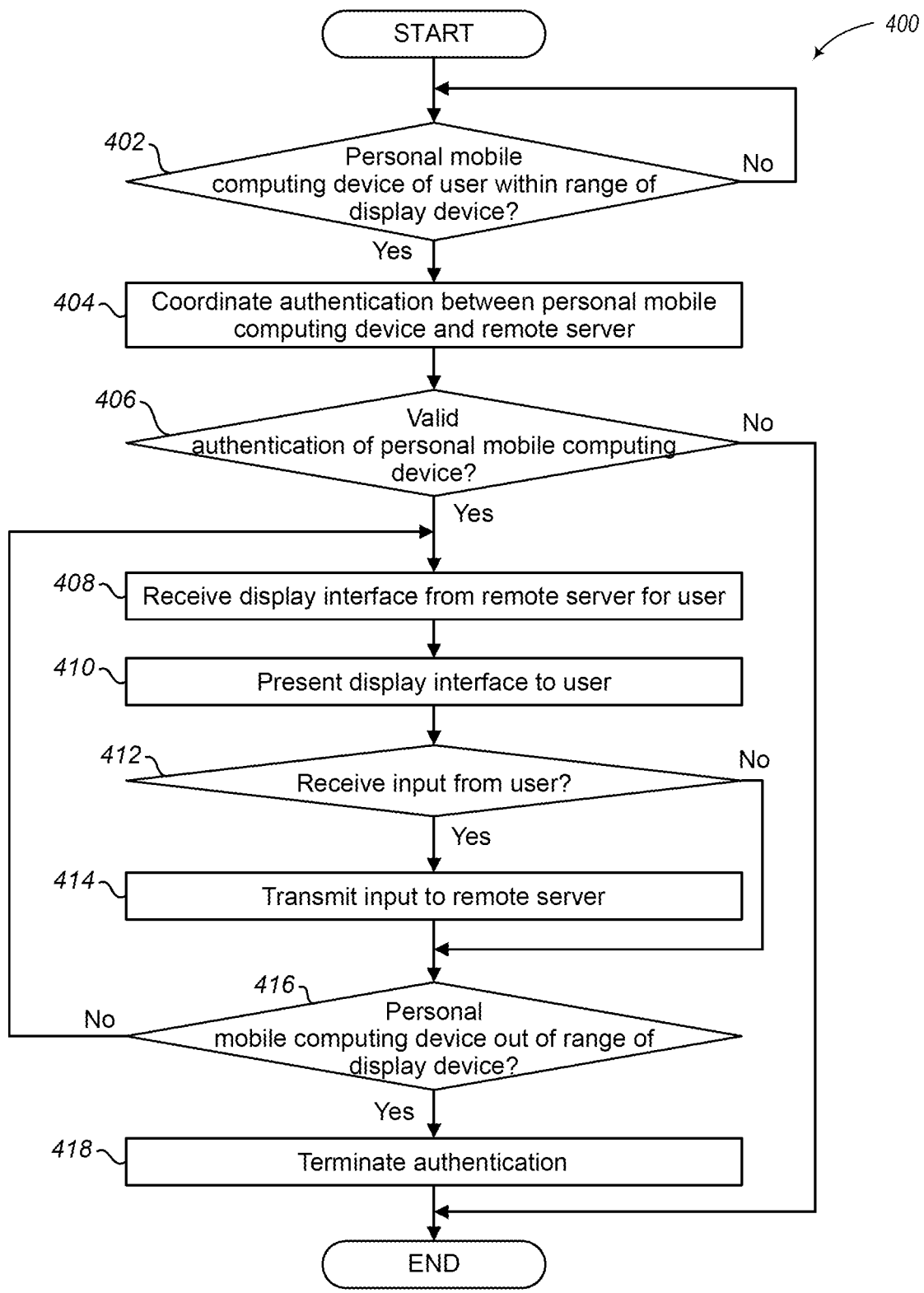
FIG. 4A illustrates a logical flow diagram generally showing one embodiment of a process for accessing a remote server from a display device to present a graphical user interface of a multi-dimensional fabric user interface in accordance with embodiments described herein.

FIG. 4A illustrates a logical flow diagram generally showing one embodiment of a process 400 for accessing a remote server from a display device to present a graphical user interface of a multi-dimensional fabric in accordance with embodiments described herein.

Process 400 begins, after a start block, at decision block 402, where a determination is made whether a personal mobile computing device of a user is within range of the display device. This determination may be made when the personal mobile computing device is within a threshold distance from the display device (e.g., using one or more range detection devices) or when the user indicates or requests to interact with the display device. If the personal mobile computing device is within range of the display device, then process 400 flows to block 404; otherwise process 400 loops to decision block 402 until a personal mobile computing device is within range of the display device.

At block 404, the display device coordinates authentication between the personal mobile computing device and a remote server. This coordination may include obtaining, requesting, or otherwise forwarding authentication keys or other information to determine the validity or authenticity of the personal mobile computing device as being authorized to access the remote server.

Process 400 proceeds to decision block 406, where a determination is made whether the personal mobile computing device is validly authenticated with the remote server. In some embodiments, the remote server may provide a token, session identifier, or other instruction to the display device indicating that the user of the personal mobile computing device is authorized to access the remote server via the display device. If the personal mobile computing device is valid, then process 400 flows to block 408; otherwise, process 400 terminates or otherwise returns to a calling process to perform other actions.

At block 408, the display device receives a display interface from the remote server for the user. In various embodiments, the display interface is customized for the user, such as if the user logged directly onto the remote server to access personal content. As described herein, this display interface is a multi-directional fabric that the user can manipulate, as described herein.

Process 400 continues at block 410, where the display device presents the display interface to the user of the personal mobile computing device. In some embodiments, the display interface is displayed directly by the display device. In other embodiments, the display interface is displayed via the personal mobile computing device.

Process 400 proceeds next to decision block 412, where a determination is made whether the display device has received input from the user. As described herein, the input may be provided via a hand gesture without touching a screen of the display device. Such hand gesture may be a swipe left or right, swipe up or down, or movement towards or away from the screen of the display device. A selection input can then be received if the user rapidly moves their hand away from the screen of the display device or if the user opens or closes his/her hand. If user input is received, then process 400 flows to block 414; otherwise, process 400 flows to decision block 416.

At block 414, the display device transmits the user input to the remote server. Process 400 proceeds to decision block 416, where a determination is made whether the personal mobile computing device is out of range of the display device (e.g., outside of a threshold distance or the user de-activated the session. If not, process 400 loops to block 408 to receive an updated or modified display interface (based on the user input) and present it to the user. If the personal mobile computing device is out of range of the display device, then process 400 flows to block 418 to terminate the authentication with the remote server.

After block 418, process 400 may terminate or otherwise return to a calling process to perform other actions. In some embodiments, process 400 may loop to decision block 402 to wait for another personal mobile computing device to be within range of the display device.

Figure 4B:
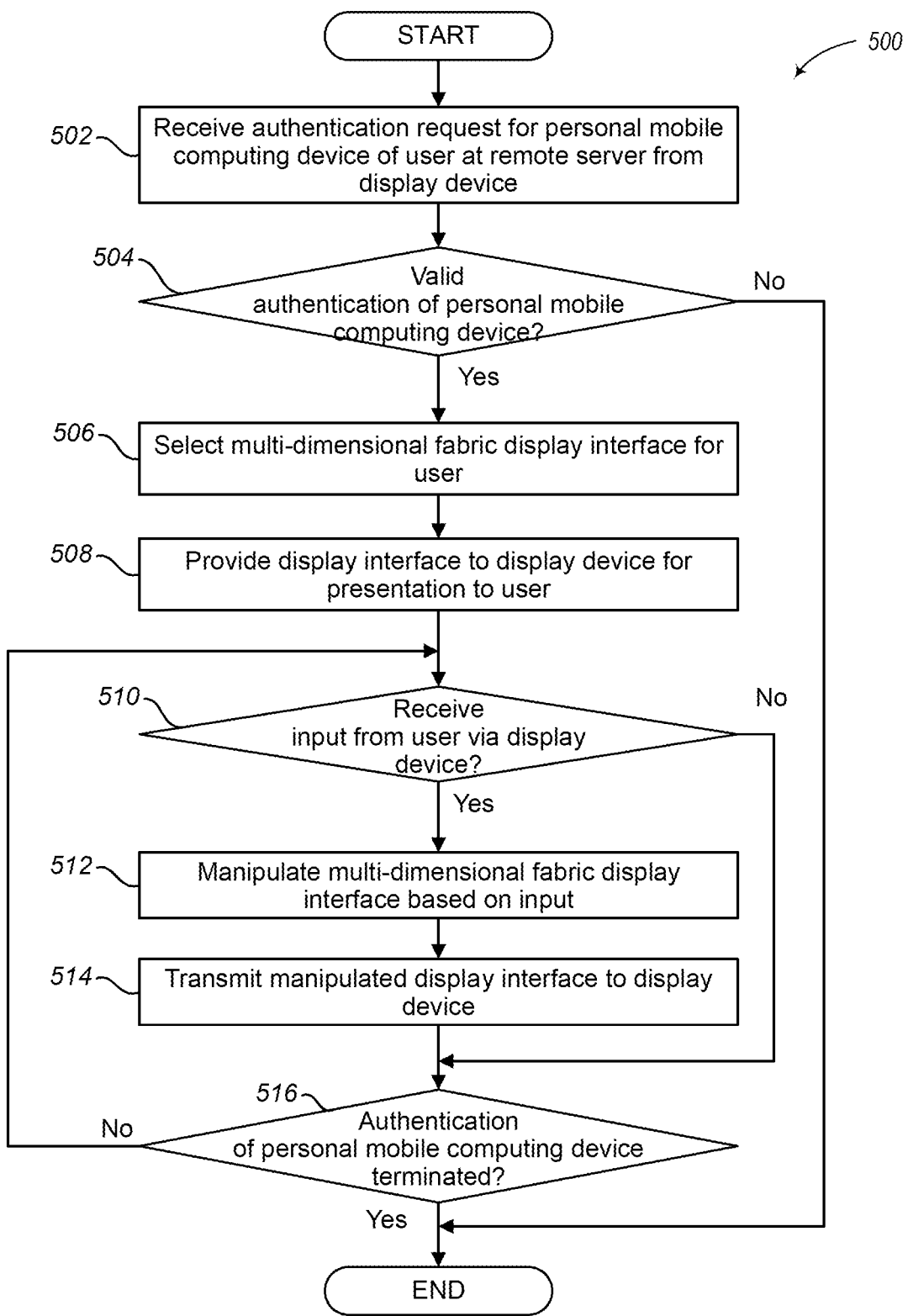
FIG. 4B illustrates a logical flow diagram generally showing one embodiment of a process for a remote server to provide a graphical user interface of a multi-dimensional fabric user interface to a display device in accordance with embodiments described herein.

FIG. 4B illustrates a logical flow diagram generally showing one embodiment of a process 450 in the system for synchronized common virtual spaces for a remote server to provide a graphical user interface of a multi-dimensional fabric to a display device in accordance with embodiments described herein.

Process 450 begins, after a start block, at block 452, where an authentication request is received at a remote server from a display device for a personal mobile computing device of a user. In some embodiments, the authentication request may include encryption keys, user credentials, or other authentication information.

Process 450 proceeds to decision block 454, where a determination is made whether the personal mobile computing device is validly authenticated or not. If the personal mobile computing device is valid, process 450 flows to block 456; otherwise, process 450 terminates or otherwise returns to a calling process to perform other actions.

At block 456, the remote server selects a multi-dimensional fabric display interface for the user of the personal mobile computing device. In some embodiments, the remote server instantiates or accesses a previously running version of the multi-dimensional fabric operating system for the user. In various embodiments, each separate user (or a group of multiple users) has a corresponding multi-dimensional fabric user interface accessible via the remote server. The multi-dimensional fabric display interface with content laid out in a fabric-like structure based on at least time, location, and topic such that the user can manipulate or move the fabric in one or more dimensions to select content.

Process 450 proceeds to block 458, where the remote server provides the selected display interface to the display device for presentation to the user. Process 450 continues at decision block 454, where a determination is made whether user input has been received from the display device. In various embodiments, the input may be a change or selection of one or more dimensions of the fabric or a user selection. If user input has been received, process 450 flows to block 462; otherwise, process 450 flows to decision block 466.

At block 462, the remote server manipulates the multi-dimensional fabric display interface based on the user input. In some embodiments, the manipulated display interface may include displaying specific content selected by the user. In other embodiments, the manipulated display interface may show a different section or area of the multi-dimensional fabric user interface based on the user input.

Process 450 proceeds next to block 464, where the remote server transmits the manipulated display interface to the display device. Process 450 continues next at decision block 466, where a determination is made whether the authentication of the personal mobile computing device has terminated. In some embodiments, the display device transmits a termination request to the remote server when the user of the personal mobile computing device walks away from or is out of range of the display device. If the authentication is terminated, process 450 terminates or otherwise returns to a calling process to perform other action; otherwise, process 450 loops to decision block 460 to receive additional user input from the display device.

Referring now to FIGS. 5, 6, and 7, the system for synchronized common virtual spaces displays a multi-dimensional fabric user interface that may be accessed from disparate virtual and physical spaces by a first user 510 and a second user 512, each having a processor-based computing device, such as a computer, smart phone, smart watch, or the like, such as the personal mobile computing devices 124 or display devices 108 shown in FIG. 1. The first user 510 and second user 512 may each enter the multi-dimensional fabric user interface and have a synchronized experience if they come to the same virtual location at the same virtual time. Additionally, as will be described in further detail below, filters are also employed by the system to control what each user 510, 512 sees and experiences in the multi-dimensional fabric user interface, thus enabling user-control of the "what," "where," and "when." In this manner, the "where" is the virtual location within the multi-dimensional fabric user interface that corresponds to an actual physical location that the user 510 selects to visit. Next, the "when" is the time of day and date at which the user selects to visit. Finally, the "what" is the content that is visible to the user to see and interact with based on the filters selected by the user 510.

Accordingly, the first user 510 and the second user 512 with the same user-selectable filters enabled have the same virtual experience in the multi-dimensional fabric user interface, while users 510, 512 with different user-selectable filters enabled have different virtual experiences in the multi-dimensional fabric user interface while still being in the same common virtual space. In some embodiments of the synchronized common virtual space, the first user 510 may interact with the virtual location and the second user 512 (or more) in the multi-dimensional fabric user interface to buy or sell goods or content, upload content to or download content from the multi-dimensional fabric, post, live stream, and the like. In one or more embodiments, the user 510 interacts with the synchronized common virtual space of the multi-dimensional fabric user interface by anchoring digital content 520 to a fixed location in the multi-dimensional fabric user interface of the common virtual space. In other embodiments, the user 510 interacts with the synchronized common virtual space of the multi-dimensional fabric user interface by anchoring digital content 530 to a user 510 (e.g., himself, herself, or another user) in the multi-dimensional fabric user interface of the common virtual space.

In another aspect of some embodiments of the system for synchronized common virtual spaces, the first user 510 and the second user 512 enter the multi-dimensional fabric user interface from different physical locations, each using their own processor-based computing device. Both the first user 510 and the second user 512 may go to a synchronized common virtual space, which may be configured to represent an actual location in the real world. The synchronized common virtual space may contain virtual store fronts 540 of actual stores in the physical world. The synchronized common virtual space may also contain advertisements 550, 560 in the multi-dimensional fabric user interface at a specific physical location, as shown in FIGS. 6 and 7. Specifically, FIG. 5 shows a multi-dimensional fabric user interface that provides a virtual representation of an actual physical location at a first time that contains virtual store fronts 540 but which contains no advertisements. FIG. 6 shows a multi-dimensional fabric user interface that provides a virtual representation of an actual physical location at a second time that contains virtual store fronts 540 and which contains advertisements 550. FIG. 7 shows a multi-dimensional fabric user interface that provides a virtual representation of actual physical location at a third time that contains virtual store fronts 540 and which contains advertisements 550 and advertisements 560.

In some embodiments, the advertisements 550, 560 in the multi-dimensional fabric user interface at a specific physical location, such as a Billboard on a specific street (e.g., Sunset Boulevard in Los Angeles, Calif.) may display the same advertisement as in the actual physical world, while in other embodiments the advertisements 550, 560 in the multi-dimensional fabric user interface at a specific physical location may display different advertisements if a user 510 anchors different digital content 520 at that virtual location (which represents an actual physical location). The synchronized common virtual space is created by anchoring digital content 520 to virtual locations that represent physical location, not by digitizing the actual physical locations. In various embodiments, digital content 520 is anchored to a location and time within the synchronized common virtual space by the corresponding storage location of the content within the multi-dimensional fabric.

Various embodiments, of the multi-dimensional fabric described herein can be used for a variety of different content storage technologies. One example technology is the fluid timeline social network described in U.S. patent application Ser. No. 16/300,028, filed Nov. 8, 2018, titled FLUID TIMELINE SOCIAL NETWORK, and issued Aug. 18, 2020, as U.S. Pat. No. 10,747,414, which is incorporated herein by reference.

Significantly, the first user 510 and the second user 512 may choose to visit not only a specific place, but also a specific time in the synchronized common virtual spaces. For example, the first user 510 and the second user 512 of the system for synchronized common virtual spaces may choose to go to a specific physical location in the past at a specific time and date (e.g., go to a concert venue when a specific concert occurred, go to a historical location when a historical event occurred, go to a restaurant when a friend's birthday occurred, go to a church when a relative's wedding occurred, and the like). As shown in FIGS. 5, 6, and 7, in these embodiments the system for synchronized common virtual spaces displays the objects and events that are anchored to that specific location and time. This is distinct from the embodiments shown in FIGS. 2 and 3 where time and distance were used as axes. Additionally, the first user 510 and the second user 512 of the system for synchronized common virtual spaces may choose to go to a specific physical location in the future at a specific time and date (e.g., go to a concert venue when a specific concert will occur, go to a historical location when a historical event will likely occur, go to a restaurant when a friend's birthday will occur, go to a church when a relative's wedding will occur, and the like). Further, a user 510 may want to go to a location in the future and see what mobile vendors (i.e., food trucks) are available at a particular location. Moreover, in some embodiments, virtual store fronts 540 are dynamically tailored with advertisements that are set at fixed locations for a fixed time period, or as part of a live feed. A user 510 may also post advertisements 550, 560 at a time adjacent to future event or sale. In various embodiments, digital content 520 is anchored to a specific time and date in the synchronized common virtual space by the corresponding storage time of the content within the multi-dimensional fabric.

In one or more embodiments, the system may access weather data for the near future and display the forecast weather at a particular location and date at a near future date that is within weather forecasting capabilities. Of course, the display of the recorded weather at a particular location and date in the past or at the present may also be generated by the system for synchronized common virtual spaces.

Figure 8:
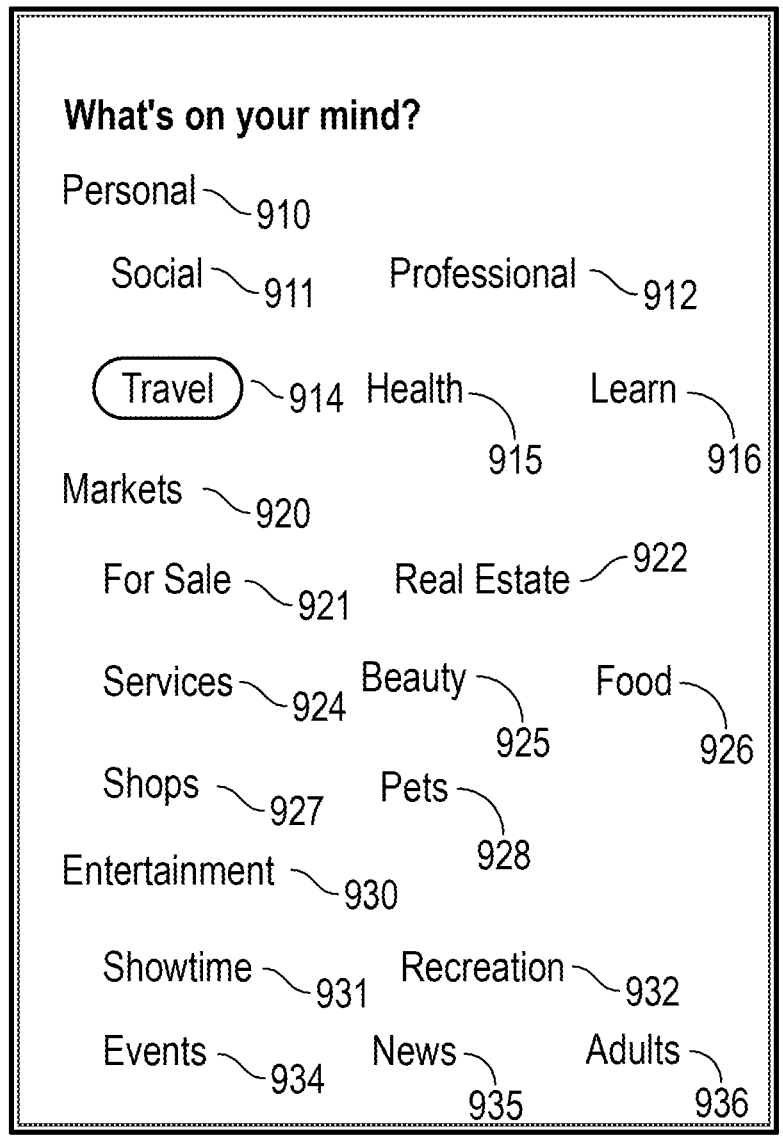
FIG. 8 illustrates a selection of filters that may be selected by a user to enable what locations and events are seen and experienced in the multi-dimensional fabric user interface, in accordance with embodiments described herein.
Figures 9A, 9B, 9C:
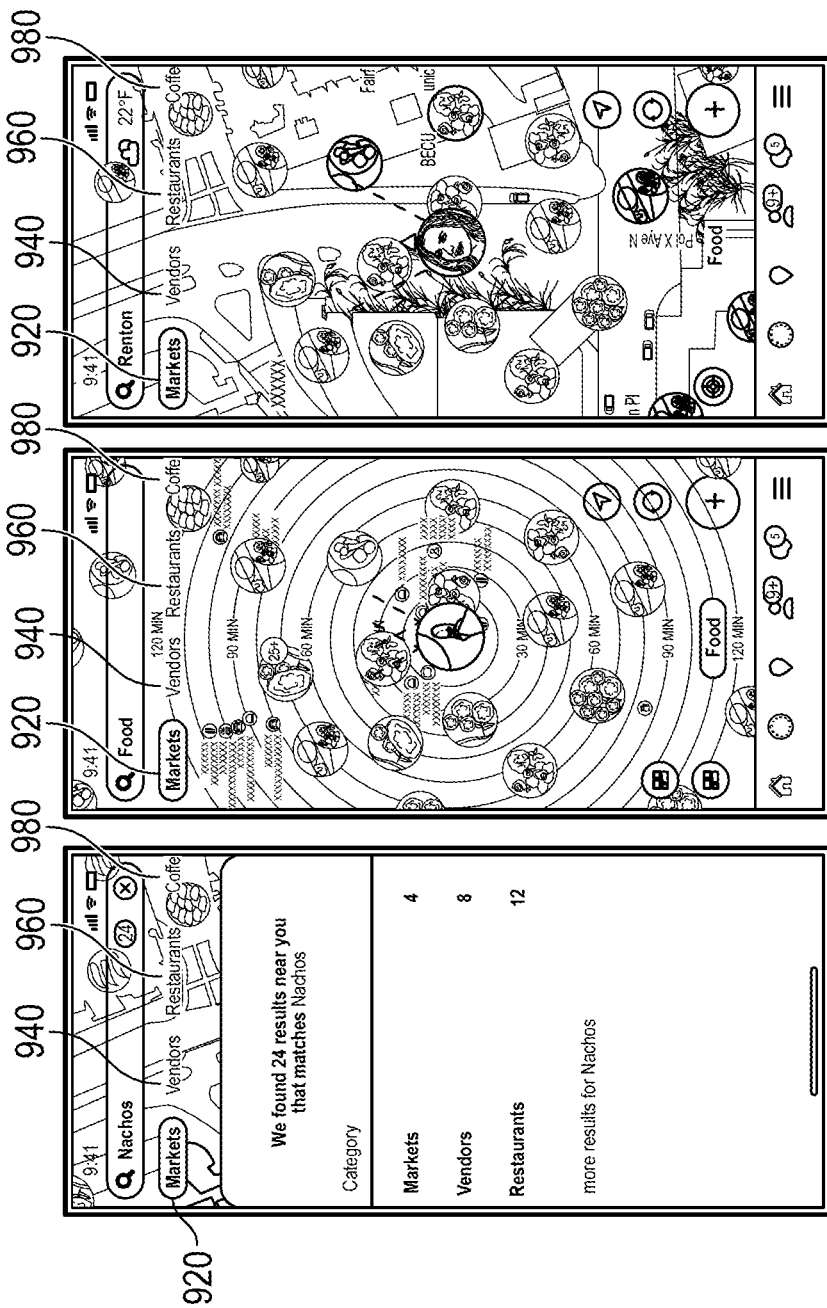
FIG. 9A illustrates a view of the multi-dimensional fabric user interface with various selected filters and search parameters entered by a user to enable what locations and events are seen and experienced, in accordance with embodiments described herein.
FIG. 9B illustrates another view of the multi-dimensional fabric user interface with various selected filters and search parameters entered by a user to enable what locations and events are seen and experienced, in accordance with embodiments described herein.
FIG. 9C illustrates still another view of the multi-dimensional fabric user interface with various selected filters and search parameters entered by a user to enable what locations and events are seen and experienced, in accordance with embodiments described herein.

Examples of various user filters that can be enabled within a common virtual space are shown in FIG. 8, which include Personal 910, Markets 920, and Entertainment 930. These filter are presented by way of example only and not by way of limitation. In some such embodiments, the Personal 910 filter includes, by way of example only, and not by way of limitation, sub-filters of: social 911, professional 912, travel 914, health 915, and learn 916. In the embodiment shown in FIG. 8, the Travel filter 914 has been selected. Additionally, in some such embodiments, the Markets 920 filter includes, by way of example only, and not by way of limitation, sub-filters of: for sale 921, real estate 922, services 924, beauty 925, food 926, shops 927, pets 928. Furthermore, in some such embodiments, the Entertainment filter includes, by way of example only, and not by way of limitation, sub-filters of: showtime, recreation, events, news, weather, adults, and the like. As shown in FIGS. 9A, 9B, 9C, other filters include, by way of example only, and not by way of limitation, vendors 940, restaurants 960, coffee 980, and the like.

Referring still to FIGS. 9A, 9B, and 9C, the locations or events that are visible in each instance of the multi-dimensional fabric user interface is controlled by the filters selected by the user. For example, what you see in the way of store fronts is controlled by filters. Each party has a multi-dimensional fabric user interface, but that interface or the content shown within the interface may appear different due to their own filters. Additionally, filters may also be used in combination with search criteria to present different iterations of the synchronized common virtual spaces. For example, in one instance shown in FIG. 9A, the user is performing a search for nachos and the system retrieves numerous search results. In this instance, the filter Markets 920 is selected, while the filters of vendors 940, restaurants 960, coffee 980, are not selected. In another iteration instance shown in FIG. 9B, the user is searching for food and viewing the search results in a circular time-space distribution of food locations and events. Again in this instance, the filter Markets 920 is selected, while the filters of vendors 940, restaurants 960, coffee 980, are not selected. In still another iteration instance shown in FIG. 9C, the user is searching the city of Renton for July 4th. In this iteration, the user may be able to see and interact with various shops, advertisements, and avatars of other users that happen to be at that same location and time, e.g., in Renton on July 4th. Once again in this instance, the filter Markets 920 is selected, while the filters of vendors 940, restaurants 960, coffee 980, are not selected.

In some embodiments of the system for synchronized common virtual spaces, a user may select whether or not they wish to be viewable by other users when visiting a specific location and time within the synchronized common virtual space of the multi-dimensional fabric user interface. If the user selects to be viewable by other users when visiting a specific location and time within the synchronized common virtual space of the multi-dimensional fabric user interface, then their avatar may be seen and interacted with by other users at that same virtual location, date, and time. If the user selects not to be viewable by other users (i.e., anonymous) when visiting a specific location and time within the synchronized common virtual space of the multi-dimensional fabric user interface, then their avatar may not be seen and interacted with by other users at that same virtual location, date, and time. In another aspect of some embodiments, acceptance into the multi-dimensional fabric user interface is usually required. The user selection of whether or not they are to be viewable may be set by location, time, or a combination of location and time.

Figure 10:
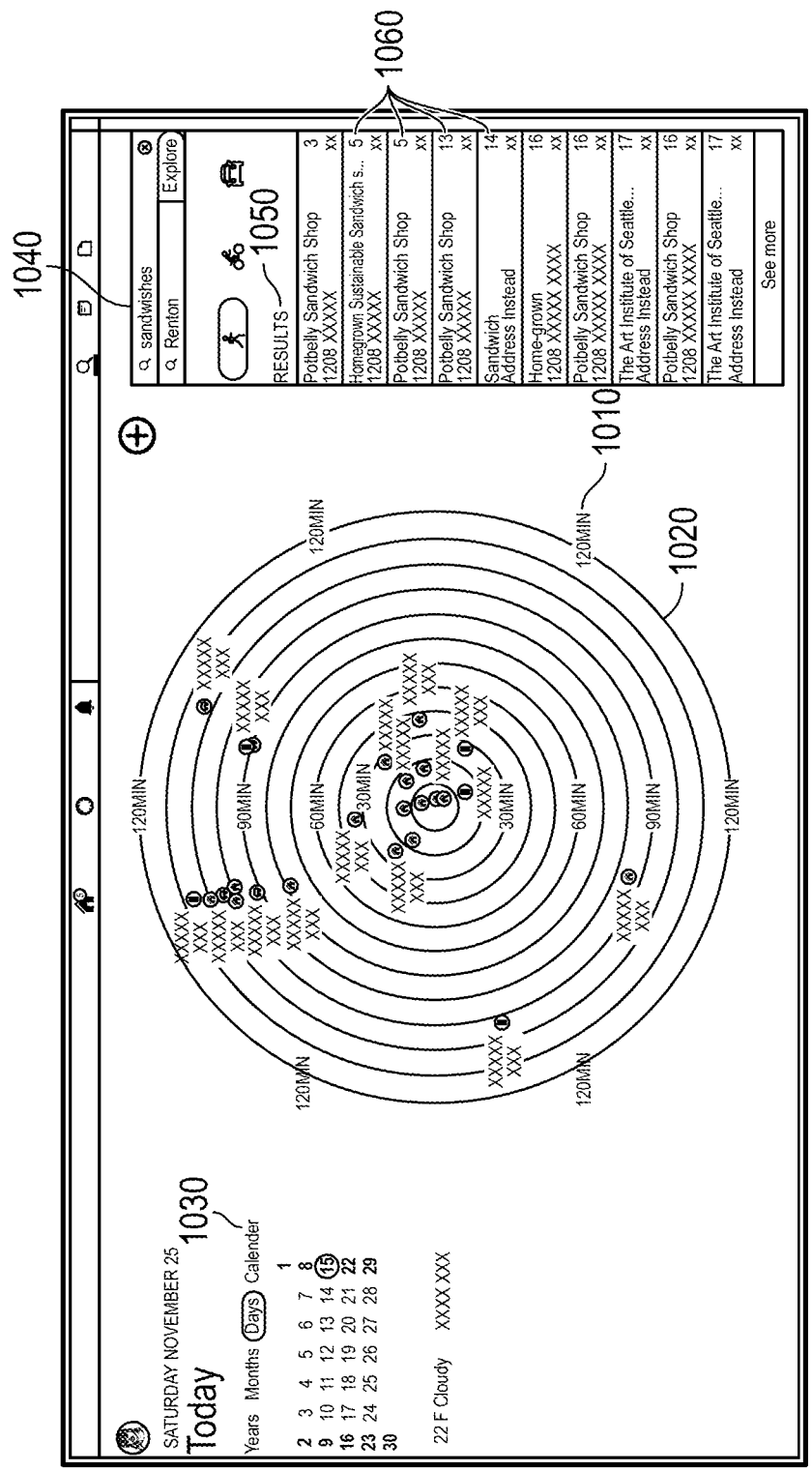
FIG. 10 illustrates one embodiment of a space-time map in which a user may perceive 120 minutes around itself, with concentric "time rings" each representing 10 additional minutes of elapsed time radiating outward from the user.

Since events are time based in their posting (e.g., anchoring in the multi-dimensional fabric user interface), a user may only see things happening while that user is at that location in space and time. In one embodiment shown in FIG. 10, a user is able to see 120 minutes 1010 around himself or herself. In this embodiment, every "time ring" 1020 represents an additional 10 minutes of elapsed time from the user's location. The "space" variable determines the circular position of the location or event on the map in the multi-dimensional fabric user interface. In the embodiment shown in FIG. 10, the left side of the screen displays a calendar 1030 with selectable dates. Additionally, in this embodiment shown in FIG. 10, the right side of the screen displays a search function 1040, search results 1050, and the mode of transportation that relates to the "time distance" 1060 of the location or event on the map from the user's current position. Example modes of transportation include automobile, bicycle, and pedestrian. The "time distance" of the location or event on the map may relate to the modes of transportation as follows: 10 minutes if automobile is selected, 20 minutes if bicycle is selected, and 30 minutes if pedestrian is selected. In some embodiments, the system dynamically accounts for additional factors such as traffic, weather, accidents, road conditions, toll roads, one-way streets, available sidewalks, available bicycle trails, protests, and the like. In other embodiments, the system does not account for such additional factors, but rather has a set rate of speed for each of the modes of transportation.

Figure 11:
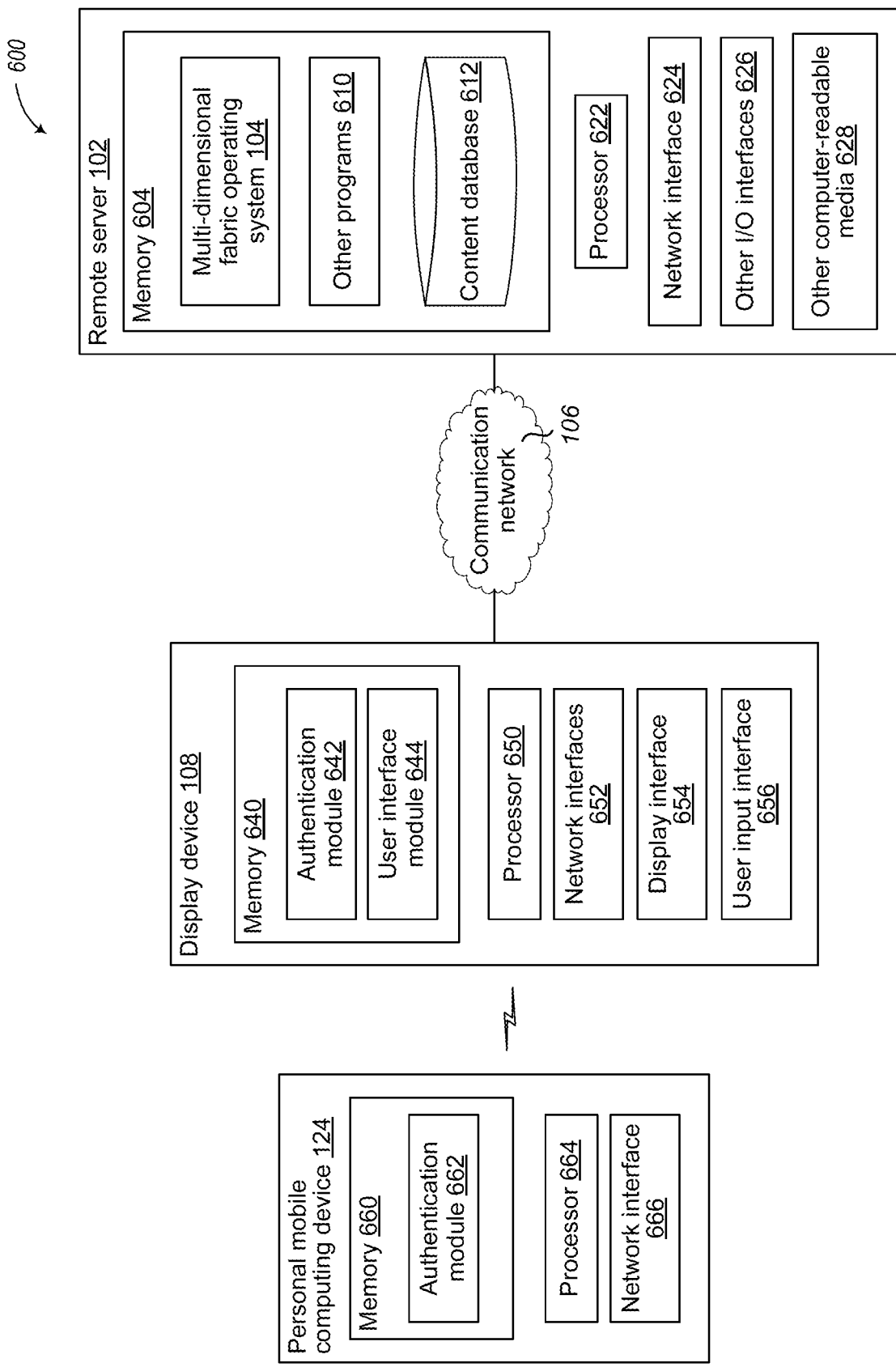
FIG. 11 illustrates a system diagram that describes one implementation of computing systems for implementing embodiments described herein.

FIG. 11 shows a system diagram that describes one implementation of computing systems for implementing embodiments described herein. System 600 includes remote server 102, one or more display devices 108, and one or more personal mobile computing devices 124.

As described herein, the remote server 102 is a computing device that can perform functionality described herein for implementing an operating system that provides a multi-dimensional fabric user interface for storing content. One or more special purpose computing systems may be used to implement the remote server 102. Accordingly, various embodiments described herein may be implemented in software, hardware, firmware, or in some combination thereof. The remote server 102 includes memory 604, one or more processors 622, network interface 624, other input/output (I/O) interfaces 626, and other computer-readable media 628. In some embodiments, the remote server 102 may be implemented by cloud computing resources.

Processor 622 includes one or more processing devices that execute computer instructions to perform actions, including at least some embodiments described herein. In various embodiments, the processor 622 may include one or more central processing units ("CPU"), programmable logic, or other processing circuitry.

Memory 604 may include one or more various types of non-volatile and/or volatile storage technologies. Examples of memory 604 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 604 may be utilized to store information, including computer-readable instructions that are utilized by processor 622 to perform actions, including at least some embodiments described herein.

Memory 604 may have stored thereon multi-dimensional fabric operating system 104. The multi-dimensional fabric operating system 104 authenticates users of personal mobile computing devices 124 via display devices 108 and provides a user interface of a multi-dimensional fabric for storing and accessing content, as described herein.

Memory 604 may include a content database 612 for storing content in accordance with the multi-dimensional fabric user interface. Memory 604 may also store other programs 610. The other programs 610 may include other operating systems, user applications, or other computer programs that are accessible to the personal mobile computing device 124 via the display device 108.

Network interface 624 is configured to communicate with other computing devices, such as the display devices 108, via a communication network 106. Network interface 624 includes transmitters and receivers (not illustrated) to send and receive data associated with the multi-dimensional fabric user interface described herein.

Other I/O interfaces 626 may include interfaces for various other input or output devices, such as audio interfaces, other video interfaces, USB interfaces, physical buttons, keyboards, haptic interfaces, tactile interfaces, or the like. Other computer-readable media 628 may include other types of stationary or removable computer-readable media, such as removable flash drives, external hard drives, or the like.

The display devices 108 are computing devices that are remote from the remote server 102. In some embodiments, the display devices 108 may include one or more computing devices and display devices. The display devices 108 coordinate authentication between the personal mobile computing devices 124 and the remote server 102. The display devices 108 receive input from the users of the personal mobile computing device 124 and provide the input to the remote server 102. The display devices 108 receive the graphical user interfaces for the multi-dimensional fabric user interface to be presented to the users of the personal mobile computing devices 124.

One or more special-purpose computing systems may be used to implement the display devices 108. Accordingly, various embodiments described herein may be implemented in software, hardware, firmware, or in some combination thereof.

The display devices 108 include memory 640, one or more processors 650, network interface 652, display interface 654, and user input interface 656. The memory 640, processor 650, and network interface 652 may be similar to, include similar components, or incorporate embodiments of memory 604, processor 622, and network interface 624 of remote server 102, respectively. Thus, processor 650 includes one or more processing devices that execute computer instructions to perform actions, including at least some embodiments described herein. In various embodiments, the processor 650 may include one or more CPUs, programmable logic, or other processing circuitry. The network interfaces 652 is also configured to communicate with the personal mobile computing devices 124, such as via Bluetooth or other short-range communication protocol or technology.

Memory 640 may include one or more various types of non-volatile and/or volatile storage technologies. Memory 640 may be utilized to store information, including computer-readable instructions that are utilized by processor 650 to perform actions, including at least some embodiments described herein. Memory 640 may store various modules or programs, including authentication module 642 and user interface module 644. The authentication module 642 may perform actions that coordinate the authentication between the personal mobile computing devices 124 and the remote server 102. The user interface module 644 receives graphical user interface data from the remote server 102 for display or presentation, via the display interface 654, to the user of the personal mobile computing devices 124. The user interface module 644 also receives user input via the user input interface 656 and provides that input back to the remote server 102. In various embodiments, one or more capacitive, radar, infrared, LIDAR, or other type of gesture capturing sensors may be used to receive the user input. In some other embodiments, the user interface module 644 may receive user inputs via other input mechanisms, such as a mouse, stylus, voice-recognition, or other input sensors. Memory 640 may also store other programs.

The personal mobile computing devices 124 are computing devices that are remote from the display devices 108 and the remote server 102. When a personal mobile computing device 124 is within a threshold range of the display device 108 or when a user of the personal mobile computing device 124 activates authentication, the personal mobile computing device 124 provides authentication data or information to the display device 108 for forwarding to the remote server 102. In various embodiments, the personal mobile computing device 124 is separate from the display device 108, such that a user can walk up to a display device 108 with the personal mobile computing device 124 to initiate the process described herein to have the display device 108 present the user interface of the multi-dimensional fabric received from the remote server 102. The user can then provide input to the display device 108, such as with hand gestures or arm movement, to manipulate the multi-dimensional fabric user interface and select content for display.

One or more special-purpose computing systems may be used to implement the personal mobile computing devices 124. Accordingly, various embodiments described herein may be implemented in software, hardware, firmware, or in some combination thereof.

The personal mobile computing devices 124 include memory 660, one or more processors 664, and a network interface 666. The memory 660, processor 664, and network interface 666 may be similar to, include similar components, or incorporate embodiments of memory 640, processor 650, and network interfaces 652 of display devices 108, respectively. Thus, processor 664 includes one or more processing devices that execute computer instructions to perform actions, including at least some embodiments described herein. In various embodiments, the processor 664 may include one or more CPUs, programmable logic, or other processing circuitry. The network interface 666 is configured to communicate with the display devices 108, but not with the remote server 102.

Memory 660 may include one or more various types of non-volatile and/or volatile storage technologies. Memory 660 may be utilized to store information, including computer-readable instructions that are utilized by processor 666 to perform actions, including at least some embodiments described herein. Memory 660 may store various modules or programs, including authentication module 662. The authentication module 662 may perform actions to communicate authentication information to a display device 108 when within a threshold distance from the display device or when activated by a user.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A system comprising:
first and second personal mobile computing devices that store authentication information, each personal mobile computing device includes a device memory that stores device computer instructions and a device processor that when executing the device computer instructions causes the personal mobile computing device to:
determine when at least one of a personal mobile computing device of the first and second personal mobile computing devices is within range of a display device of first and second display devices;
coordinate authentication between the personal mobile computing device and a remote server; and
receive input from the first user including a first virtual location, date, and time at which the first user requests to interactively visit, and receive input from the second user including a second virtual location, date, and time at which the second user requests to interactively visit, wherein the first virtual location, date, and time that the first user requests to interactively visit are the same as the second virtual location, date, and time that the second user requests to interactively visit; and the remote server includes a server memory that stores server computer instructions and a server processor that when executing the server computer instructions causes the remote server to:

create a multi-dimensional fabric user interface specific of an interactive common virtual space for the first and second users of first and second personal mobile computing devices by anchoring digital content to the virtual location that represents an actual physical location, wherein the interactive common virtual space represents the actual physical location at a specific time and is displayed to first and second users of the first and second personal mobile computing devices based on valid authentication of each personal mobile computing device in association with each user;

enable the first and second users to enter the multi-dimensional fabric user interface of the interactive common virtual space via the first and second display devices, wherein the interactive common virtual space is synchronized by the remote server to enable the first and second users that are using the first and second personal mobile computing devices and the first and second display devices, respectively, to access the first virtual location, date, and time requested by the first and second users that represents the actual physical location;

manipulate the multi-dimensional fabric user interface of the interactive common virtual space based on received input from the first and second users via their associated first and second personal mobile computing devices, wherein manipulation of the interactive multi-dimensional fabric includes anchoring digital content to the virtual location that represents the actual physical location, anchoring digital content to a user in the interactive multi-dimensional fabric, enabling display of anchored digital content, and disabling display of anchored digital content; and enable the first and second users to have a synchronized experience within the manipulated multi-dimensional fabric user interface of the interactive common virtual space via the first and second display devices, wherein manipulating the multi-dimensional fabric user interface of the interactive common virtual space includes enabling the first and second users to interact with each other and with virtual objects and virtual events at the first virtual location that represents the actual physical location, date, and time at which the first and second users request to visit.

2. The system of claim 1, wherein the server processor executes further server computer instructions that further cause the remote server to:
   enable filters that control the sights and experiences that are visible and available to the first and second user in the multi-dimensional fabric user interface of the common virtual space.

3. The system of claim 1, wherein the server processor executes further server computer instructions that further cause the remote server to:
   enable the first and second users with same user-selectable filters selected to have the same virtual experience in the multi-dimensional fabric user interface, and enable the first and second with different user-selectable filters selected to have different virtual experiences in the multi-dimensional fabric user interface.

4. The system of claim 1, wherein the server processor executes further server computer instructions that further cause the remote server to:
   enable the first and second users to interact with the virtual location and each other in the multi-dimensional fabric user interface to execute one or more of the following actions: buy, sell, upload, download, post, and live stream.

5. The system of claim 1, wherein the virtual objects include one or more of stores, restaurants, vendors, offices, buildings, parking lots, and parks.

6. The system of claim 1, wherein the server processor executes further server computer instructions that further cause the remote server to:
   enable advertisements in the multi-dimensional fabric user interface of the common virtual space at a specific virtual location and for a specific period of time.

7. The system of claim 1, wherein the server processor executes further server computer instructions that further cause the remote server to:
   enable the first and second users to visit a specific place and a current time in the multi-dimensional fabric user interface of the common virtual space.

8. The system of claim 1, wherein the server processor executes further server computer instructions that further cause the remote server to:
   enable the first and second users to visit a specific physical location in a past at a specific time and date in the multi-dimensional fabric user interface of the common virtual space.

9. The system of claim 1, wherein the server processor executes further server computer instructions that further cause the remote server to:
   enable the first and second users to visit a specific physical location in a future at a specific time and date in the multi-dimensional fabric user interface of the common virtual space.

10. The system of claim 1, wherein the server processor executes further server computer instructions that further cause the remote server to:
    enable the first and second users to visit a specific physical location and appear as their own avatar in the multi-dimensional fabric user interface of the common virtual space.

11. The system of claim 1, wherein the server processor executes further server computer instructions that further cause the remote server to:
    enable the first and second users to visit a specific physical location and be anonymous without giving up their location in the multi-dimensional fabric user interface of the common virtual space.

12. The system of claim 1, wherein distance in the multi-dimensional fabric user interface of the common virtual space is measured by travel time.

13. The system of claim 12, wherein travel time-distance in the multi-dimensional fabric user interface of the common virtual space relates to a travel time for specific selectable modes of transportation.

14. The system of claim 12, wherein the server processor executes further server computer instructions that further cause the remote server to:
    enable travel time-distance in multi-dimensional fabric user interface of the common virtual space to dynamically adjust for one or more of traffic, whether, accidents, road conditions, toll roads, one-way streets, available sidewalks, available bicycle trails, and protests.

15. The system of claim 12, wherein the server processor executes further server computer instructions that further cause the remote server to:
 enable travel time-distance in the multi-dimensional fabric user interface of the common virtual space to be displayed using concentric time rings radiating out from the virtual location of the first or second user, wherein the concentric time rings each represent a number of minutes of elapsed time.

16. The system of claim 1, wherein the manipulation of the multi-dimensional fabric user interface of the common virtual space based on the received input from the first and second users includes anchoring digital content to the multi-dimensional fabric user interface of the common virtual space.

17. The system of claim 1, wherein the manipulation of the multi-dimensional fabric user interface of the common virtual space based on the received input from the first and second users includes anchoring digital content to a user in the multi-dimensional fabric user interface of the common virtual space.

18. The system of claim 1, wherein the server processor executes further server computer instructions that further cause the remote server to:
 enable the first and second users to see each other's avatar and interact with others' avatars, in response to receiving requests from the first and second users to visit the first virtual location, date, and time; and
 enable the first and second users to not see each other's avatar nor interact with others' avatar, in response to receiving requests from the first and second users to visit a different virtual location, date, or time.

19. The system of claim 1, wherein the server processor executes further server computer instructions that further cause the remote server to:
 access recorded weather data and display recorded weather at a particular location and date in a past or present, and access forecast weather data and display the forecast weather at a particular location and date at a near future date that is accessible within forecasting weather data.

20. A remote server system for synchronization of multiple user devices in a common virtual space, the system comprising:
 a server processor;
 a server memory that stores server computer instructions, the server processor when executing the server computer instructions causing the remote server to:
  create a multi-dimensional fabric user interface specific of an interactive common virtual space for the first and second users of first and second personal mobile computing devices by anchoring digital content to a virtual location that represents an actual physical location, wherein the interactive common virtual space represents the actual physical location at a specific time and is displayed to first and second users of the first and second personal mobile computing devices based on valid authentication of each personal mobile computing device in association with each user;
  enable the first and second users to enter the multi-dimensional fabric user interface of the interactive common virtual space via the first and second display devices, wherein the interactive common virtual space is synchronized by the remote server to enable the first and second users that are using the first and second personal mobile computing devices and the first and second display devices, respectively, to access the first virtual location, date, and time requested by the first and second users that represents the actual physical location;
  manipulate the multi-dimensional fabric user interface of the interactive common virtual space based on received input from the first and second users via their associated first and second personal mobile computing devices, wherein manipulation of the interactive multi-dimensional fabric includes anchoring digital content to the virtual location that represents the actual physical location, anchoring digital content to a user in the interactive multi-dimensional fabric, enabling display of anchored digital content, and disabling display of anchored digital content; and
  enable the first and second users to have a synchronized experience within the manipulated multi-dimensional fabric user interface of the interactive common virtual space via the first and second display devices, wherein manipulating the multi-dimensional fabric user interface of the interactive common virtual space includes enabling the first and second users to interact with each other and with virtual objects and virtual events at the first virtual location that represents the actual physical location, date, and time at which the first and second users request to visit.

21. The system of claim 20, wherein the server processor executes further server computer instructions that further cause the remote server to:
 enable the first and second users to see each other's avatar and interact with others' avatars, in response to receiving requests from the first and second users to visit a same virtual location, date, and time; and
 enable the first and second users to not see each other's avatar nor interact with others' avatar, in response to receiving requests from the first and second users to visit a different virtual location, date, or time.

22. A method for synchronization of multiple user devices in a common virtual space using a remote server, the method comprising:
 creating a multi-dimensional fabric user interface of an interactive common virtual space that is specific for the first and second users of first and second personal mobile computing devices, wherein the interactive common virtual space represents an actual physical location at a specific time and is displayed to first and second users of the first and second personal mobile computing devices based on valid authentication of each personal mobile computing device in association with each user;
 enabling the first and second users to enter the multi-dimensional fabric user interface of the common virtual space that represents the actual physical location via first and second users of the first and second personal mobile computing devices;
 manipulating the multi-dimensional fabric user interface based on received input from the first and second users via their associated first and second personal mobile computing devices, wherein the received input includes a virtual location, date, and time at which the first and second users request to visit, wherein manipulation of the interactive multi-dimensional fabric includes anchoring digital content to the virtual location that represents the actual physical location, anchoring digital content to a user in the interactive multi-dimensional fabric, enabling display of anchored digital content, and disabling display of anchored digital content;

providing the manipulated multi-dimensional fabric user interface to the first and second users for display;

synchronizing the interactive common virtual space using the remote server to enable the first and second users using the first and second personal mobile computing devices, respectively, to access the virtual location that represents an actual physical location, date, and time requested by the first and second users; and enabling the first and second users to have a synchronized experience within the manipulated multi-dimensional fabric user interface of the interactive common virtual space, and interact with one or more of each other, virtual objects, and virtual events in the virtual location that represents the actual physical location, date, and time at which the first and second users request to visit that represents the actual physical location.

23. The method of claim 22, wherein the server processor executes further server computer instructions that further cause the remote server to:

enable the first and second users to see each other's avatar and interact with others' avatars, in response to receiving requests from the first and second users to visit a same virtual location, date, and time; and enable the first and second users to not see each other's avatar nor interact with others' avatar, in response to receiving requests from the first and second users to visit a different virtual location, date, or time.

\* \* \* \* \*